Nov. 2, 1965 P. D. STELTS 3,215,313
LOW HEAT LEAK CONNECTOR FOR CRYOGENIC SYSTEM
Filed Oct. 1, 1964
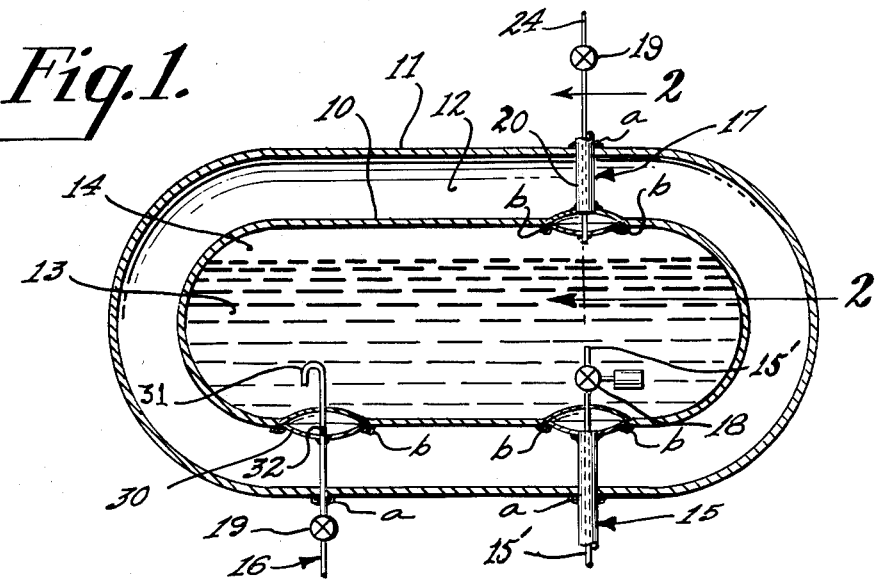
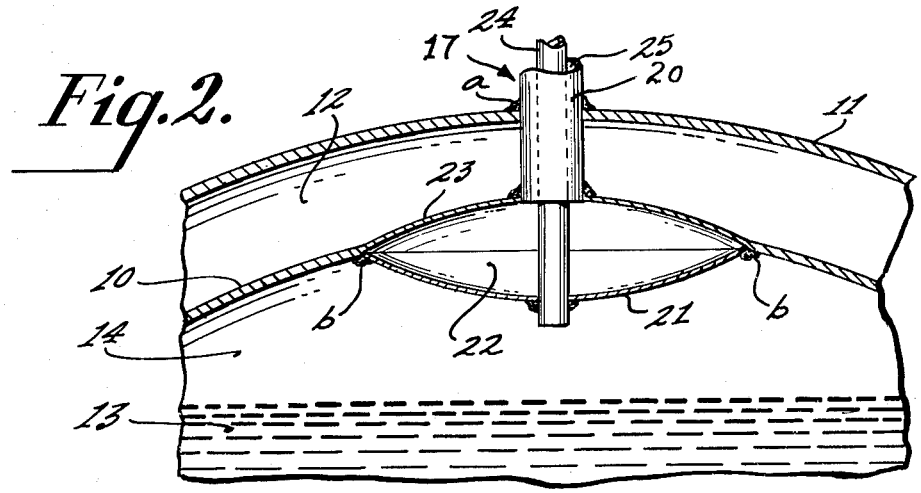
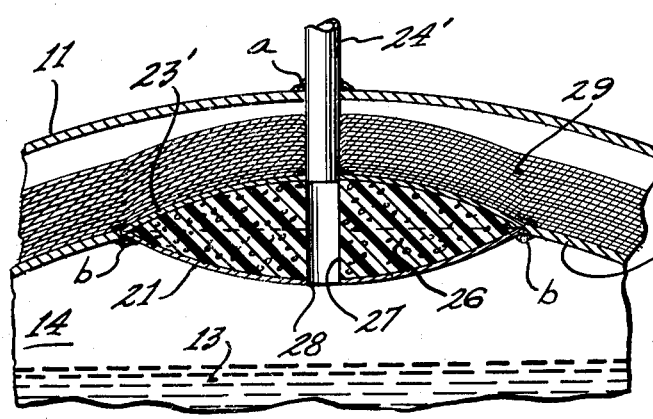
INVENTOR.
Philip D. Stelts
BY William K. Klabunde
ATTORNEY.

United States Patent Office 3,215,313
Patented Nov. 2, 1965

3,215,313
LOW HEAT LEAK CONNECTOR FOR
CRYOGENIC SYSTEM
Philip D. Stelts, Center Valley, Pa., assignor to Air Products and Chemicals Inc., Philadelphia, Pa., a corporation of Delaware
Filed Oct. 1, 1964, Ser. No. 400,857
10 Claims. (Cl. 222—131)

This invention relates to connector means between a storage vessel or tank containing liquified gas and a transfer line for conveying fluid substance to or from the vessel. The invention described herein was made in the performance of work under a NASA contract and is subject to the provisions of the National Aeronautics and Space Act of 1958, Public Law 85–568 (72 Stat. 426; 42 U.S.C. 2451), as amended.

The invention finds particular application to cryogenic systems wherein it is desirable or essential to minimize heat leak from the surrounding atmosphere into the contained body of extremely cold liquid maintained at a temperature below the critical temperature for the particular gas. Although not limited thereto, the invention, because of its compact, efficient and lightweight design, may be used to advantage in propellant storage and delivery systems for space vehicles.

In systems of the general type referred to, it is necessary to provide highly efficient insulation means for the storage vessel and possibly for the fluid transfer lines connected thereto and forming part of the delivery system or for vent lines leading away from the storage vessel. In certain applications, such as space vehicle use, it may be required that the overall storage and delivery systems be designed for minimum weight and volume, in which case provision must be made for overall insulation of the highest efficiency and for a structural design in the areas surrounding the transfer line connections which will provide a maximum length of heat leak path commensurate with structural stability and the imposed limitations as to size or volume.

It is common practice to insulate such storage vessels by enclosure within an oversize shell, the space between the vessel and shell being occupied, at least in part, by insulating material, and generally being evacuated to provide a vacuum insulation. Dependent upon the particular design and environment in which the system is to be employed, the fluid transfer lines may or may not be insulated, and likewise may be under vacuum.

In cryogenic systems, a known method and means for insulating a shell-encased vessel or tank containing an extremely cold body of liquid, such as liquified gas, is to pack the space between the storage vessel and the outer shell with powdered or granular insulating material, such as polyurethane foam, perlite, etc., and to maintain such insulation space under vacuum. With such type of construction it is possible to minimize heat leak by so shaping or routing the portion of the transfer line which passes through the insulated area as to provide an extended heat leak path. Since the transfer line itself has a coefficient of heat conduction higher than that of the insulation, a straight transfer line taking the shortest possible path between the outer shell and the storage vessel would provide an avenue for rapid flow of heat, or heat leak, from the surrounding atmosphere into the storage vessel. One expedient for preventing such adverse heat leak is to shape the transfer line tubing with one or more reverse bends so as to form a somewhat tortuous path through the fill of insulation material. Another expedient is to offset or misalign the openings for the transfer line tubing in the shell and the vessel, so that the tubing will necessarily have a substantial length of run along the insulation space, more or less following the wall contours of the shell and vessel.

Another, and generally more practicable, type of insulation is that commonly known as super-insulation, which embodies a multiple radiation shield of laminar construction comprising layers of extremely thin reflective material wrapped around the inner vessel or tank. Such insulating shield will generally occupy a substantial major portion of the space between the vessel and the outer shell, some free space usually being left for ease of assemblage. The space may or may not be under vacuum, and the portion thereof not occupied by the radiation shield may, if desired, be filled with other insulating material in granular or rigid form.

In those cases where a fill of powdered or granular insulating material is employed instead of super-insulation, it is not too difficult to achieve a good distribution of the insulating material around the shell-encased portion of the transfer line tubing and to effectively insulate the joints where the tubing pierces the sheel and vessel walls.

Where super-insulation is employed, however, any extensive longitudinal run of tubing, that is, substantially parallel to the space-defining walls, must pass between layers of reflective material. This poses a serious problem of assemblage, and it is extremely difficult to carefully work the sheets of insulating material around the bends and the joints in a manner which will minimize heat leak in these areas.

From the standpoint of ease of assemblage and economy of construction, it is more desirable to have the fluid transfer lines enter the vessel at an angle substantially normal to the vessel surface and pass along the shortest straight path through the insulation space, whether they be fill lines for introducing the cold liquid into the storage vessel or vent lines for release therefrom of gas from the gaseous phase of the contained material.

In accordance with the invention a low heat leak connection is formed between a transfer line for conveying extremely low temperature gas in liquid or gaseous phase and a shell-encased storage vessel or tank containing a supply or body of liquefied gas. The outer shell is substantially larger than the encased storage vessel so as to provide an intermediate peripheral insulation space which may be wholly or partially occupied by insulating material and which may or may not be maintained under vacuum.

Dependent upon the external temperature conditions surrounding the shell, and possibly other factors, the transfer line may or may not be jacketed to insulate the conveyed fluid stream from its external environment. In any case, for the purpose of description the outermost conduit, whether it be the pipe or tubing which actually conveys the fluid stream or an insulating pipe jacket surrounding the same, is to be considered and referred to as the transfer line, and the fluid stream conveyed thereby will be considered as being confined within the transfer line.

The end portion of the transfer line passes through close-fitted, aligned openings formed in the spaced walls of the outer shell and vessel, and is rigidly attached to both walls in a fluid-tight seal. The common axis of the aligned openings is so arranged as to direct the transfer line to or away from the vessel at an angle substantially normal to the adjacent surface areas of the shell and vessel.

A thin, convexly curved, plate is affixed to the inner wall surface of the vessel so as to symmetrically cover an extensive area surrounding the opening in the vessel. The perimeter of the curved plate is joined to the vessel wall in fluid-tight seal, the opposed and oppositely-curved surfaces of the vessel and plate forming what is best described as a blister on the inner-wall of the vessel.

The geometric configuration of the curved plate is necessarily dependent upon the curvature or contour of the vessel in the area to which it is attached. Thus, if the vessel wall is spherical in the area of contact, the plate may be circular, and if the vessel wall is cylindrical in such area, the plate will be of irregular shape conforming to the line of intersection between the two curved bodies. The wide, shallow space within the blister forms an insulating region which may or may not be occupied by insulating material and/or be under vacuum.

The curved plate is provided with a geometrically centered opening in substantial axial alignment with the openings in the vessel and shell, the plate opening being sized to permit unrestricted flow of incoming or outgoing fluid between the vessel and the transfer line.

When the fluid transfer line is of the jacketed type, comprising an outer pipe or jacket and a substantially smaller inner pipe or tube which actually confines the flowing stream of fluid, the jacket terminates at the vessel wall side of the blister and the inner fluid-containing pipe projects beyond the end of the transfer line conduit, across the blister region and through the central opening in the plate side of the blister. A fluid-tight seal is provided between the fluid-conveying pipe and the plate. With this arrangement the blister is in open communication with, or forms a continuation of, the insulating space between the transfer line jacket and its encased fluid-conveying pipe. The blister and it communicating annular insulating space within the transfer line conduit may both be filled with the same insulating material or with different types of insulating materials, or only one of these regions may be filled with insulating material. Furthermore, the entire insulating area may or may not be under vacuum, as desired.

When the fluid transfer line is not jacketed, its fluid-conveying passageway communicates directly with the blister at the vessel side thereof, since the transfer line terminates at the wall of the vessel. With this arrangement, the blister is filled with a single rigid body of insulating material. A central passageway is formed through the rigid body of insulation to provide an unrestricted flow of fluid therethrough between the end of the transfer line conduit and the opening in the plate side of the blister.

The blister is relatively wide in comparison to the diameter of the fluid transfer line, so that the shortest possible path for heat flow by conduction through the heat conductive materials used in the fabrication of the fluid transfer line and the storage vessel will be considerably longer than that which would be provided in the absence of the blister. Thus, the long path for heat leakage from the external atmosphere or environment into the interior of the storage vessel extends from the joint between the fluid transfer line and the outer shell, along the end portion of the fluid transfer line which crosses the vessel insulation space to the joint between the end of the fluid transfer line and the shell, and then along the shell side of the blister to the joint between the shell and the perimeter of the blister plate. For most efficient operation, the shortest arcuate dimension across the blister should be in the range of 5–15 times the diameter of the fluid transfer conduit and, preferably, the ratio of such dimensions should be in the order of about 10 to 1.

The blister is also relatively deep in the central region in comparison to the diameter of the fluid transfer line, especially when the fluid transfer line is not of the jacketed type. In such case, the central hole through the rigid insulation within the blister provides open communication between the interior of the vessel and the joint formed between the end of the fluid transfer line and the vessel side of the blister, so that, conceivably, some heat leakage might occur by radiation and convection through the central hole instead of following the conductive path from the joint to the perimeter of the blister along the area of the vessel wall encompassed by the blister. The flow path across the center of the blister should in any case be of relatively small diameter and should have a length to diameter ratio in the order of about 5 to 1. The principal consideration dictating the choice of such ratio is that there should be no preferential heat leak path through the central thickness of the blister rather than by conduction transversely across its wider dimension.

For a fuller understanding of the invention reference may be had to the following specification and claims taken in connection with the accompanying drawing forming a part of this application and showing certain preferred embodiments of the invention, in which drawing FIGURE 1 is a diagrammatic representation of a typical cryogenic storage vessel having a shell enclosure for insulating a contained body of liquefied gas from the surrounding atmosphere and having insulated and uninsulated fluid transfer lines connected thereto for communication with both a region of the vessel containing gas in liquid phase and a region of the vessel occupied by the gaseous phase;

FIGURE 2 is an enlarged fragmentary section of the vessel and shell illustrating in detail the connection thereto of a jacketed fluid transfer line; and FIGURE 3 is a similar fragmentary section of the vessel and shell showing the connection thereto of an uninsulated fluid transfer line, and showing alternative provisions for insulation of the connector.

Referring to the drawing, FIG. 1 diagrammatically illustrates a typical cryogenic storage vessel or tank having associated inlet and outlet fluid transfer line conduits connected thereto in positions to communicate with both the liquid phase of the gas at the bottom of the vessel and the gaseous phase which is always present at the top of the vessel, the transfer lines being connected to the vessel in accordance with the invention by means which will permit the minimum of heat leak from the surrounding atmosphere to the contents of the vessel, whether in liquid or gaseous phase.

The storage vessel or tank 10 is of standard construction, comprising a hollow cylindrical body closed at its ends by spherical or dished heads, and is disposed with its longitudinal axis in horizontal position.

Vessel 10 is encased within a larger shell 11 of similar shape and spaced from the outer walls of the vessel sufficiently to provide a peripheral insulating area 12 between the vessel and shell.

The vessel 10 is adapted to contain a storage supply of low temperature gas which is maintained in both a liquid phase 13 and a gaseous phase 14, the vessel being supplied with liquefied gas through a fill line represented either by a jacketed, fluid transfer line, such as that generally indicated by numeral 15, or by an unjacketed, fluid transfer line, generally indicated by numeral 16. Both types, for the sake of convenience, are illustrated in the same figure of the drawing, although only one fill line may be required. The vessel is vented of gas in the liquid phase through a fluid transfer line, generally indicated by numeral 17, at the top of the vessel.

Control valves are provided for each fluid transfer line. One type of control valve, a standard solenoid-operated valve 18, is shown in association with fluid transfer line 15 and is located on a portion of the confined fluid path 15' which extends upwardly into the body of liquefied gas. A standard type of shut-off valve 19 is shown in association with each of fluid transfer lines 16 and 17, respectively, both valves being located outside the insulated vessel.

To reduce heat flow by radiation the insulating space 12 between the vessel 10 and the shell 11 may be provided with any standard type of insulation suitable to the environment and the need. For example, the space may be filled with a commercial type of granular or powdered insulating material, or it may be occupied in substantial part by what is well known in the art as super-insulation, comprising a multiple radiation shield consisting of many layers of very thin reflective material wrapped around the inner vessel 10. Vacuum insulation may be employed alone or in conjunction with the above-mentioned types of insulating material.

The improvement in provisions for connecting the fluid transfer lines to the insulated vessel resides primarily in the particular means for forming a low heat leak path between the end of the transfer line and the inside wall of the gas storage vessel. The connecting arrangements for insulated and for uninsulated transfer lines are different in certain respects, which will be apparent from a consideration of FIGS. 2 and 3, illustrating the details of the two types of connection.

FIG. 2 shows an enlarged fragmentary sectional view of the connection between the jacketed fluid transfer line 17 and the insulated vessel 10 taken along line 2—2 of FIG. 1. This line is a vent line for withdrawal of gaseous phase material from the space 14 above the body of liquefied gas 13. The outermost member of the jacketed transfer line 17, that is, the jacket 20 extends through and is sealed, as by soldering or welding, within aligned openings in the walls of the shell 11 and the vessel 10, so as to form a rigid connection.

A convexly curved plate 21 is affixed to the inner wall surface of the vessel 10, concentric with or at least symmetrically positioned with respect to the projected axis of the transfer line. The perimeter of plate 21 is joined to the vessel wall in fluid-tight connection, the curved plate forming a hollow blister 22 on the inner wall surface. In some cases it may be desirable to deform the wall of the vessel 10 outwardly in the blister area, as shown at 23, to provide both sides of the blister with approximately the same dome-shaped curvature, but such symmetrically curved construction is not required. It is desirable, however, to make the inside wall of the blister, as thin as possible, as by indenting or otherwise working the metal of the wall from the inside of the vessel 10 to form a bulge or dome in its outer contour, or by use of a thin metal plate insert, as shown in FIG. 3.

In those cases where the blister is to be located on a wall whose curvature is such that deformation of the vessel wall in the blister area would complicate the problem of cutting and shaping the plate to fit the perimeter of the deformed area, the wall may retain its initial curvature, and the curved plate may be cut to fit the vessel contour. Thus, if the plate is spherically curved, the contour of its perimeter will correspond to the line of intersection between the spherical plate surface and the cylindrical, spherical, or other curved surface of the vessel in the area where the blister is to be formed.

Alternatively, instead of deforming the inner wall of the vessel, as at 23, both sides of the blister may be formed of separate curved plates which, because of the structural strength or rigidity of the blister construction, may be formed of much thinner material than that employed for the vessel 10.

Since fluid transfer line 17 is a jacketed line, the fluid stream conveyed thereby is confined centrally within the jacket 20 by a smaller tube 24 whose outer wall is spaced from the inner wall of the jacket so as to provide an annular insulating space 25. Tube 24 extends across the narrow dimension of the blister and passes through a central opening formed in the plate 21, the tube being joined to the latter in a fluid-tight seal. Thus, the fluid-conveying tube 24 of the transfer line 17 is in open communication with the interior of the vessel 10 at a point within the gaseous phase region 14, and the jacket 20 is in open communication with the interior 22 of the blister. The two insulating spaces 22 and 25 may be under vacuum, if desired, and one or both may contain any suitable type of commercially available insulating material, not shown.

The heat leakage problem to which the invention is directed is the possibility excessive leakage of heat from the external atmosphere to the inside of the vessel along a conductive path starting at the juncture of the fluid transfer line and the wall of the outer shell 11 and terminating at the joint where the end of the fluid transfer line, directly or indirectly, comes into heat exchange contact with the extremely cold contents of the storage vessel. These termini of the heat leakage path will be referred to as points $a$ and $b$ in the following description, point $a$ being the warm point and point $b$ being the cold point.

In the connector joint of FIG. 2, heat leakage from the atmosphere contacting the outer surfaces of vessel 10 and the external portion of jacket 20 travels from a point $a$ inwardly along the jacket wall through the shell opening and across the insulating space 12 to the juncture of the jacket with the blister wall portion 23 of the vessel 10. The heat then travels radially outward from the end of the jacket along the side 23 of the blister to the juncture point $b$ between the plate 21 and the vessel wall 10.

It is most desirable that such heat flow into the vessel be kept at a minimum. The efficiency of the above-described type of connection, as compared for example to present known construction of the type wherein a fluid transfer line enters an opening in the outer shell, crosses the insulating space, and projects through an opening in the inner vessel, is best illustrated by comparison of the equations by which heat flow may be determined in each case.

For the known type described immediately above, the heat flow is calculated by the equation $$q = \frac{kA}{L} \Delta T \qquad (1)$$

where:

$k$ = mean thermal conductivity of pipe material.
$A$ = cross-sectional metal area of pipe.
$L$ = length of pipe from point $a$ to point $b$.
$\Delta T$ = temperature difference between points $a$ and $b$.

It is apparent from the equation that for any pipe material selected having a thermal conductivity constant of $k$, and for any given temperature differential $\Delta T$ between the outer environment and the cold interior of the vessel, the only factors which may be varied to reduce the value of $q$ (heat leakage) are A and L. A is kept to a minimum only by using the smallest size pipe which will provide the desired flow and by using pipe having the thinnest walls possible, commensurate with pressure and other stress conditions in the system. After the pipe size and pipe wall thickness have been reduced to a minimum consistent with safety, the only possibility for further reduction in heat leakage is to increase the length of pipe or tubing running through the insulating space between shell and vessel. This is the reason why the art has been required either to greatly offset the transfer line openings in the shell and vessel to provide a long run for the piping therebetween, or to provide a tortuous path for the tubing, with little or no offset in the placement of the transfer line openings. Either of these expedients introduces serious problems with respect to assemblage and to the installation of insulating material, particularly the type known as super-insulation.

For the improved connector of this invention, wherein the side of the blister which is contiguous to the insulating space between shell and vessel forms a "thermal break" in the transfer line piping, the heat flow may be calculated by an equation suited to the size and shape of the blister.

The simplest form of blister is circular, as where a circular plate is affixed to a spherical vessel surface. The shape of the blister becomes more complicated with other curvatures in the vessel wall.

Assuming a circular blister to be formed, the heat flow may be calculated by the equation $$q = \frac{2\pi k t \Delta}{\ln \frac{Do}{Di}} \quad (2)$$

where:

$k$ and $\Delta T$ are the same as for Equation 1.
$t$ = thickness of materal comprising shell side of blister.
$Do$ = diameter of circular portion of vessel covered by the blister plate.
$Di$ = diameter of opening formed in vessel to receive fluid transfer line.
$\ln$ = natural log.

In this equation, the resistance to heat flow in the short length of pipe is ignored. To minimize the heat flow $q$ it is necessary to make the value of $t$ as small as possible and/or to make the ratio of $Do/Di$ as large as possible.

For other blister configurations it is possible to adjust the Equation 2, but in any case the foregoing conclusions with respect to the adjustment of factors $t$ and $Do/Di$ to minimize heat leakage still hold true. Because of the inherent structural stability of such blister construction, it is possible to make the vessel side of the blister extremely thin, without necessarily making the plate side of the blister equally thin, and also to make the blister area relatively wide as compared to the size of the opening in the vessel side, such as in a diameter ratio of 5:1 to 15:1.

FIG. 3 shows a modified form of connection used with an unjacketed fluid transfer line 24'. Here, too, the connector is shown at the top of the vessel as a vent line communicating with the gas phase space 14 above the liquid body 13. In shape, the blister is similar to that of FIG. 2, but the upper wall 23' of the blister is a separate plate insert instead of being a deformed portion of vessel wall 10, as at 23 of FIG. 2. The entire blister may be fabricated separately and inserted in the wall. Pipe 24' is joined at its side to the shell 11 and its end to the wall 23' of the bilster. Since pipe 24' is exposed to the warmer temperature outside the shell, it should terminate at the top wall of the blister. The blister area is filled with a body 26 of rigid foam insulation, or other suitable insulating material, through which a central hole 27 is bored to provide a fluid passageway between the opening 28 in the plate side of the blister and the end of fluid transfer line 24'. In this particular modification, the space between vessel 10 and shell 11 has been shown as partly filled with super-insulation 29, although it is to be understood that the use of super-insulation is not limited to this form of the invention.

In order to channel the heat leakage so that it will have to follow the longest possible path into the vessel, that is, down tube 24' to the top wall 23' of the blister and then along blister wall 23' to its peripheral juncture with the vessel wall, the passageway 27 through the insulation material 26 should have a high ratio of length to diameter. This will minimize the circulation of gas within the passageway 27, which otherwise might cause a substantial heat by-pass by convection from the end portion of the tube 24 to the gas phase space 14 at the top of the vessel.

Where the fluid transfer line is used as a fill line communicating with the body of liquefied gas 13 at the bottom of vessel 10, as for example line 15 or line 16 shown in FIG. 1, a slight modification is required in the line which actually confines the liquid stream leading into the body of liquid. Precaution must be taken to prevent liquid from running into the line by force of gravity and boiling off therein by what may be termed a "percolation" effect to produce an apparent high heat leak. To this end there is provided either a solenoid-operated valve 18, as shown on the portion of the line 15' which extends into the body of liquid 13, or a goose-neck extension 31 having an inverted-U turn which extends within the body of liquid, as shown in connection with unjacketed fluid transfer line 16. The extension 31 conveys the liquid from the discharge end of transfer line 16, which terminates at the blister wall 30 or slightly within the blister area 31. A thermal break needs to be provided in the fluid path between the end of line 16 and the cold body of liquid 13. For such purpose the extension 31 is coupled to the end of line 16 by an insulating connector 32 of low heat conductivity. Alternatively, the entire goose-neck extension 31 may be made of low conductivity material, such as nylon. In this modification, the blister area 31 may be under vacuum or may be filled with known insulating material.

The connecting devices of the invention effectively minimize the possibilities of serious heat leak through the joints between the jacketed or unjacketed fluid transfer lines and the shell-insulated vessel for storage of liquefied gas. The invention provides a compact connection between transfer line and vessel requiring a minimum run of pipe between the vessel and its surrounding shell and greatly simplifies the installation of multiple radiation shield type of insulation between the vessel and the shell.

Obviously many modifications and variations of the invention as hereinbefore set forth may be made without departing from the spirit and scope thereof, and therefore only such limitations should be imposed as are indicated in the appended claims.

What is claimed is:

1. In a spaced shell-insulated vessel for storage of a body of liquefied gas having an upper gaseous phase, connector means for effecting fluid transfer between said vessel and a fluid transfer line, with minimum heat leak across the insulating space from the surrounding atmosphere to the contents of the vessel, which comprises: means forming a relatively wide and shallow blister on the wall of the vessel at the point of transfer line connection therewith, said shell and the opposed walls of said blister having aligned openings, the common axis of which passes centrally through said blister and is substantially normal to the surfaces of the vessel and shell; a fluid transfer line conduit extending through the opening in said shell and the opening in the near side wall of said blister and being in fluid-tight connection with the shell and said blister wall; and means associated with said transfer line conduit for confining said fluid as a continuous stream pasing through and between said aligned openings and being out of contact with the walls of said blister.

2. Connector means as in claim 1, in which said means for confining said fluid as a stream of uniform flow through and between said aligned openings comprises a confined passage-forming means extending from the end of said fluid transfer line conduit at least across said blister.

3. Connector means as in claim 2, in which said blister is substantially filled with a rigid body of heat insulating material having a central passageway extending between the blister holes to form said confined passage-forming means extending across said blister, said body of heat insulating material providing a thermal break between the central wall portions of said blister.

4. Connector means as in claim 2, disposed at the bottom of said vessel, in which said confined passage-forming means extending from the end of said fluid transfer line conduit at least across said blister comprises a tube extending between the openings in said blister, projecting a short distance upwardly within said body of liquefied gas and terminating in means for preventing backflow of liquid downwardly into said means for confining said fluid as a continuous stream passing through said aligned openings.

5. Connector means as in claim 4, in which said tube extending upwardly within said body of liquefied gas has a reverse bend constituting said means for preventing backflow of liquid.

6. Connector means as in claim 5, in which the portion of said tube passing between the walls of said blister forms a thermal break between said walls.

7. Connector means as in claim 6, in which at least the end portion of said tube immediately adjacent to the end of said fluid transfer line forms the thermal break between the walls of the blister.

8. Connector means as in claim 1, in which said means associated with said transfer line conduit for confining said fluid as a continuous stream of substantially uniform flow area passing through and between said aligned openings comprises: a pipe within and spaced from the walls of said fluid transfer line to provide an annular insulating space in open communication with said blister, said pipe extending through said aligned openings and being joined in fluid tight connection only to the plate side of said blister.

9. Connector means as in claim 8, in which said pipe extends into the body of liquefied gas within said vessel and includes means to prevent back flow of liquid through said pipe.

10. Connector means as in claim 9 for connecting a jacketed fluid transfer line to the bottom of said vessel, said pipe extending upwardly within the bottom region of said body of liquefied gas and terminating in a reverse bend.

No references cited.

LOUIS J. DEMBO, *Primary Examiner.*

UNITED STATES PATENT OFFICE
CERTIFICATE OF CORRECTION

Patent No. 3,215,313  
November 2, 1965

Philip D. Stelts

It is hereby certified that error appears in the above numbered patent requiring correction and that the said Letters Patent should read as corrected below.

Column 1, line 52, for "liquified" read -- liquefied --; column 6, line 2, for "possibility" read -- possible --; column 7, lines 3 to 6, the equation should appear as shown below instead of as in the patent:

$$q = \frac{2\pi k t \Delta T}{\ln \frac{Do}{Di}}$$

Signed and sealed this 16th day of August 1966.

(SEAL)  
Attest:

ERNEST W. SWIDER  
Attesting Officer

EDWARD J. BRENNER  
Commissioner of Patents